(12) United States Patent
Wickstone et al.

(10) Patent No.: US 10,605,212 B2
(45) Date of Patent: Mar. 31, 2020

(54) MULTI-FUEL RAIL APPARATUS

(71) Applicants: WESTPORT POWER INC., Vancouver (CA); DELPHI INTERNATIONAL OPERATIONS LUXEMBOURG S.A.R.L., Bascharage (LU)

(72) Inventors: Michael C. Wickstone, North Vancouver (CA); Alain M. J. Touchette, Vancouver (CA); Randall T. Mark, Nanoose Bay (CA); Kory L. Zeller, Vancouver (CA); Jeremy Garnier, Vancouver (CA); Mark Graham, Westbury on Trym (GB); Mehmet Dönmez, Izmir (TR); Cüneyt Altinol, Izmir (TR); Michael De Bruijn, Bristol (GB)

(73) Assignees: WESTPORT POWER INC., Vancouver (CA); DELPHI INTERNATIONAL OPERATIONS LUXEMBOURG S.A.R.L., Bascharage (LU)

( * ) Notice: Subject to any disclaimer, the term of this patent is extended or adjusted under 35 U.S.C. 154(b) by 0 days.

(21) Appl. No.: 15/750,109

(22) PCT Filed: Aug. 4, 2016

(86) PCT No.: PCT/CA2016/050912
§ 371 (c)(1),
(2) Date: Feb. 2, 2018

(87) PCT Pub. No.: WO2017/020131
PCT Pub. Date: Feb. 9, 2017

(65) Prior Publication Data
US 2018/0223780 A1    Aug. 9, 2018

Related U.S. Application Data

(60) Provisional application No. 62/201,074, filed on Aug. 4, 2015.

(51) Int. Cl.
*F02M 43/04* (2006.01)
*F02M 63/02* (2006.01)
(Continued)

(52) U.S. Cl.
CPC ......... *F02M 43/04* (2013.01); *F02D 19/0642* (2013.01); *F02D 19/0663* (2013.01);
(Continued)

(58) Field of Classification Search
CPC ............ F02D 19/0663; F02D 19/0684; F02D 19/0694; F02D 19/08; F02M 21/0218;
(Continued)

(56) References Cited

U.S. PATENT DOCUMENTS

| 5,197,436 | A | * | 3/1993 | Ozawa | F02B 75/22 |
| | | | | | 123/456 |
| 5,511,527 | A | * | 4/1996 | Lorraine | F02B 75/22 |
| | | | | | 123/456 |

(Continued)

FOREIGN PATENT DOCUMENTS

| CA | 2 819 718 A1 | 9/2013 |
| CA | 2 875 512 A1 | 2/2015 |
| CN | 102782301 A | 11/2012 |

OTHER PUBLICATIONS

International Search Report and Written Opinion of the International Searching Authority, dated Oct. 6, 2016, for International Application No. PCT/CA2016/050912, 7 pages.

(Continued)

*Primary Examiner* — Stephen K Cronin
*Assistant Examiner* — Robert A Werner

(74) *Attorney, Agent, or Firm* — Seed IP Law Group LLP

(57) ABSTRACT

A multi-fuel rail apparatus for an internal combustion engine communicates fuel from 10 a first fuel source and a second fuel source to a plurality of fuel injectors. Each fuel injector receives fuel from the multi-fuel rail apparatus through a branch connection for each fuel. The multi fuel rail apparatus has a first elongate member including a first longitudinal bore spaced apart from a second longitudinal bore and first and second fuel inlets for fluidly communicating first and second fuels into the first and 15 second longitudinal bores respectively. There is a branch connecting structure for each fuel injector along the first elongate member for fluidly connecting the first and second longitudinal bores with respective branch connections from respective fuel injectors.

21 Claims, 3 Drawing Sheets

(51) Int. Cl.
| | | |
|---|---|---|
| | *F02D 19/06* | (2006.01) |
| | *F02M 55/02* | (2006.01) |
| | *F02M 43/00* | (2006.01) |
| | *F02D 19/08* | (2006.01) |
| | *F02M 21/02* | (2006.01) |

(52) U.S. Cl.
CPC ..... *F02D 19/0684* (2013.01); *F02D 19/0694* (2013.01); *F02D 19/08* (2013.01); *F02M 21/02* (2013.01); *F02M 43/00* (2013.01); *F02M 55/02* (2013.01); *F02M 55/025* (2013.01); *F02M 63/029* (2013.01); *Y02T 10/32* (2013.01); *Y02T 10/36* (2013.01)

(58) Field of Classification Search
CPC .. F02M 21/0245; F02M 55/02; F02M 55/025; F02M 37/0064; F02M 43/00; F02M 43/04
USPC ......................................... 123/304, 525, 575
See application file for complete search history.

(56) References Cited

U.S. PATENT DOCUMENTS

| | | | | |
|---|---|---|---|---|
| 6,050,611 | A * | 4/2000 | Asada | F02M 55/025 |
| | | | | 285/133.4 |
| 6,588,406 | B2 * | 7/2003 | Oprea | F02D 19/0647 |
| | | | | 123/304 |
| 6,604,509 | B1 * | 8/2003 | Hegner | F02M 47/027 |
| | | | | 123/456 |
| 8,522,752 | B2 * | 9/2013 | Kim | F02M 43/00 |
| | | | | 123/468 |
| 9,038,599 | B2 * | 5/2015 | Matsukawa | F02M 55/025 |
| | | | | 123/456 |
| 2002/0062822 | A1 | 5/2002 | Watanabe et al. | |
| 2004/0003795 | A1 * | 1/2004 | Kondo | F02M 55/005 |
| | | | | 123/447 |
| 2005/0127665 | A1 * | 6/2005 | Usui | F02M 55/025 |
| | | | | 285/197 |
| 2007/0040053 | A1 * | 2/2007 | Date | F02M 61/1846 |
| | | | | 239/533.2 |
| 2008/0262701 | A1 | 10/2008 | Williams et al. | |
| 2010/0084489 | A1 * | 4/2010 | Chang | F02M 47/027 |
| | | | | 239/132 |
| 2011/0214642 | A1 | 9/2011 | Shafer et al. | |
| 2012/0204835 | A1 | 8/2012 | Kim et al. | |
| 2014/0034020 | A1 | 2/2014 | Baldwin et al. | |
| 2014/0102415 | A1 * | 4/2014 | Wyban | F02D 19/0647 |
| | | | | 123/456 |
| 2014/0116523 | A1 | 5/2014 | Puckett et al. | |
| 2016/0108874 | A1 * | 4/2016 | Meek | F02M 47/027 |
| | | | | 123/470 |
| 2017/0159625 | A1 * | 6/2017 | Brasche | F02M 43/04 |

OTHER PUBLICATIONS

Extended European Search Report dated Feb. 4, 2019, for Application No. 16832018.2, 9 pages.
Chinese Office Action dated Oct. 9, 2019 for Chinese Application No. 201680057128.9, 14 pages. (w/English translation).
Chinese Search Report dated Sep. 25, 2019 for Chinese Application No. 201680057128.9, 4 pages. (w/English translation).

* cited by examiner

MULTI-FUEL RAIL APPARATUS

FIELD OF THE INVENTION

The present application relates to a multi-fuel rail apparatus for an internal combustion engine.

BACKGROUND OF THE INVENTION

For internal combustion engines that operate with more than one directly injected fuel, the fuels need to be delivered to one or more fuel injectors. The fuel injectors are configured either above or to the side of the cylinder head to directly introduce fuel into combustion chambers before or after intake valves close, and are situated under a valve cover that shields and isolates the top of the engine block from the outer environment. Fuel that is directly injected is typically supplied to a fuel rail in the form of a cylindrical tube (so called fabricated or assembled rails) that extends under the valve cover to deliver the fuel in close proximity to the direct fuel injectors. For each direct fuel injector, a fuel line of a branch connection extends directly between the fuel rail and the injector either above or to the side of the cylinder head. Alternatively, the fuel line can comprise a bore through the cylinder head to the side of the fuel injector where a fuel gallery extends around the fuel injector that is typically sealed with a radial seal. However, when one of the fuels is a gaseous fuel that undergoes long soak-in periods at high pressure the gallery seals can be compromised as gaseous fuel pressure drops rapidly, such as during engine shut-down events or when engine operating conditions change. When more than one fuel is directly injected, there needs to be at least one fuel rail for each fuel. Space constraints under the valve cover can make it difficult to package the fuel rails therein without modification to the engine compartment. One solution to this problem is to provide one or more internal rails to deliver one or both fuels through the cylinder head in the vicinity of the fuel injectors such that a branch connection can extend between the fuel rail and each fuel injector. However, for a variety of reasons the use of internal fuel rails is not always possible. The internal fuel rails can change the thermodynamic properties of the cylinder head that could lead to reliability and/or durability issues, and the fuels could be heated that although may provide ignition benefits, it may also lead to increased deposit formation in and around fuel injector nozzles.

Specially adapted couplings that employ a metal-to-metal sealing structure can connect the fuel lines to the cylindrical tube fuel rail. An end-form on the fuel line comprises a conical or spherical like shape that mutually engages an inwardly tapering section in an outer surface of the fuel rail. The inwardly tapering section is surrounded by a fitting, which can be welded to the fuel rail or the fitting can be an annular fitting that is slid into position along the fuel rail and fastened thereto. A nut threadedly engages the fitting to secure the end-form in place creating a fluidly sealed connection between the end-form and the inwardly tapering section. The compressive force between the end-form on the fuel line and the inwardly tapering section in a wall of the fuel rail puts constraints on the minimum thickness of the wall and/or the maximum fuel pressure that can be sealed. The specially adapted couplings can be excessively large, and the assembly of the cylindrical tube fuel rails with the specially adapted couplings and fuel lines can be complicated, labour intensive and time consuming.

The state of the art is lacking in techniques for delivering two or more fuels to each combustion chamber for one or more fuel injectors. The present apparatus and method provides a technique for improving the delivery of two or more fuels to direct fuel injectors in an internal combustion engine.

SUMMARY OF THE INVENTION

An improved multi-fuel rail apparatus for an internal combustion engine communicates fuel from a first fuel source and a second fuel source to a plurality of fuel injectors. Each fuel injector receives fuel from the multi-fuel rail apparatus through a branch connection for each fuel. The multi fuel rail apparatus has a first elongate member including a first longitudinal bore spaced apart from a second longitudinal bore and first and second fuel inlets for fluidly communicating first and second fuels into the first and second longitudinal bores respectively. There is a branch connecting structure for each fuel injector along the first elongate member for fluidly connecting the first and second longitudinal bores with respective branch connections from respective fuel injectors. In an exemplary embodiment the first elongate member is a first elongate forged member. The first fuel can be a gaseous fuel and the second fuel can be a liquid fuel.

In another exemplary embodiment, each branch connecting structure includes a first boss and a second boss extending from an outer surface of the first elongate member. The first boss has a first inwardly tapering section and a first lateral bore extending between the first inwardly tapering section and the first longitudinal bore. The second boss has a second inwardly tapering section and a second lateral bore extending between the second inwardly tapering section and the second longitudinal bore. The first and second inwardly tapering sections are for fluid sealing engagement with respective branch connections.

The first boss can be a female connector with female threads and the second boss can be male connector with male threads. When the first boss is a female connector, it can include an annular collar extending outwardly from the first inwardly tapering section, and an inner surface of the annular collar can have threaded connections for mutually engaging a branch connection that is fluid communication with the first longitudinal bore. When the second boss is a male connector, it can include an annular collar extending inwardly from the first inwardly tapering section, and an outer surface of the annular collar can have threaded connections for mutually engaging a branch connection in fluid communication with the second longitudinal bore. When the first fuel is a gaseous fuel and the first boss is mutually engaged and secured with a branch connection the first inwardly section forms a gaseous fluid seal with the branch connection. At least one of the first and second bosses can include a weep line downstream from the first and second inwardly tapering sections respectively. Alternatively, the weep line can be an axial weep line through a nut in the branch connections. At least one of the branch connections can include a nut threadedly engaging the branch connecting structure, where the nut extends from the branch connecting structure through a valve cover of the internal combustion engine.

The first longitudinal bore is a first rail for the first fuel, and the second longitudinal bore is a second rail for the second fuel. A diameter of the first longitudinal bore can be greater than, or less than, or equal to a diameter of the second longitudinal bore. The first and second longitudinal bores can be blind bores in an exemplary embodiment, and the first longitudinal bore can extend from one end of the first elongate member and the second longitudinal bore can extend from an end opposite the one end of the first elongate member.

In another exemplary embodiment, the multi-fuel rail apparatus can further include a second elongate member like the first elongate member, and the first and second elongate members can be first and second elongate forged member respectively. The second elongate forged member can be identical to the first elongate forged member but with machined in variations. The first and second longitudinal bores of at least the first elongate member further includes first and second fuel outlets respectively. There can be a first conduit fluidly connecting the first fuel outlet with the first fuel inlet between the first and second elongate members respectively; and a second conduit fluidly connecting the second fuel outlet with the second fuel inlet between the first and second elongate members respectively. The first and second fuel outlets of the second elongate member can be fluidly sealed shut with terminations. An angle between longitudinal axes of the first fuel outlet of the first elongate member and the first fuel inlet of the second elongate member can be at least substantially 90 degrees and an angle between longitudinal axes of the second fuel outlet of the first elongate member and the second fuel inlet of the second elongate member can be at least substantially 90 degrees. In an exemplary embodiment, the first fuel outlet is near one end of at least the first elongate member, and the second fuel outlet is near an end opposite the one end.

Alternatively, a first conduit can fluidly connect the first fuel outlet with the first fuel inlet between the first and second elongate members respectively; and a second conduit can fluidly connect the second fuel outlet with the second fuel inlet between the second and first elongate members respectively. The first and second fuel outlets of the second and first elongate members respectively can be sealed shut with terminations. An angle between longitudinal axes of the first fuel outlet of the first elongate member and the first fuel inlet of the second elongate member can be at least substantially 90 degrees and an angle between longitudinal axes of the second fuel outlet of the second elongate member and the second fuel inlet of the first elongate member can be at least substantially 90 degrees.

DETAILED DESCRIPTION OF PREFERRED EMBODIMENT(S)

Figure 1:
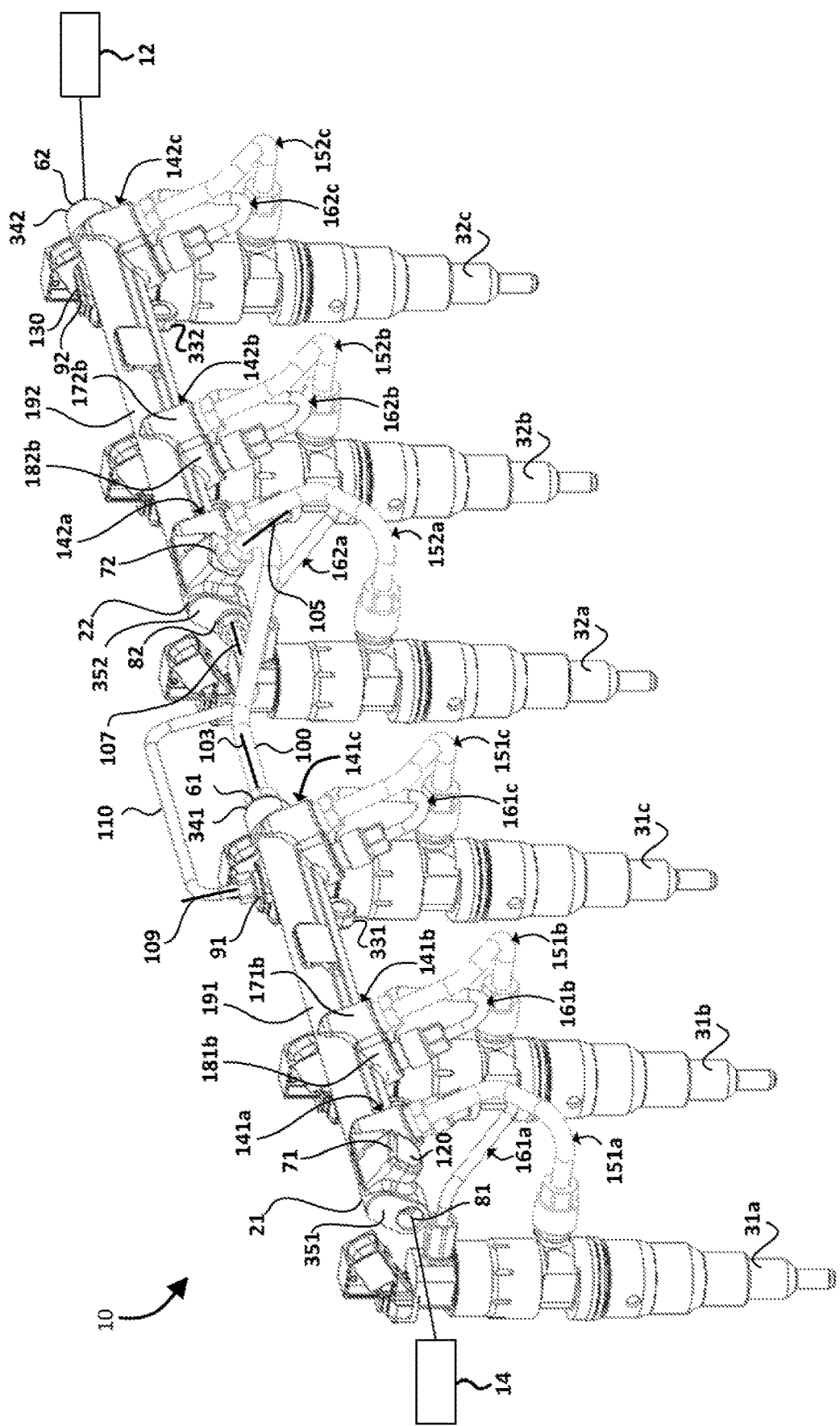
FIG. 1 is a perspective view of a multi-fuel rail apparatus with branch connections to a plurality of fuel injectors according to one embodiment.
Figure 2:
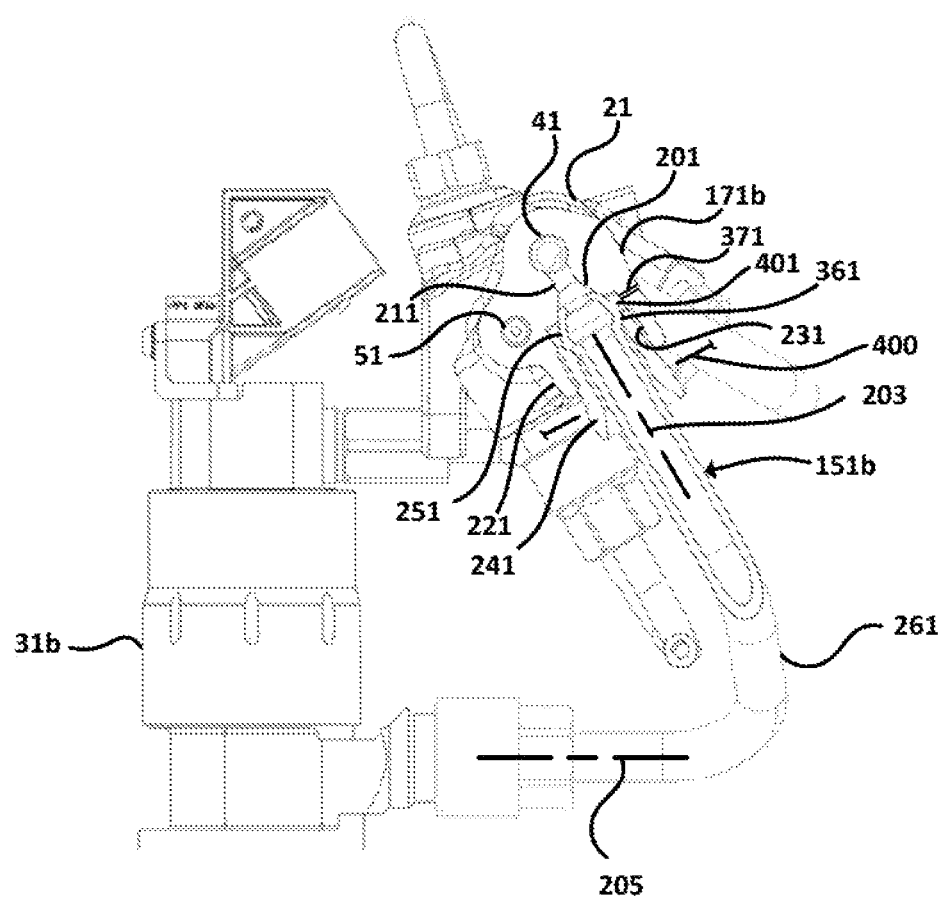
FIG. 2 is a cross-sectional view of a branch connecting structure in fluid communication with a first longitudinal bore of the multi-fuel rail apparatus and a branch connection of FIG. 1

Referring to FIG. 1, there is shown multi-fuel rail apparatus 10 including first elongate forged member 21 and second elongate forged member 22 that serve as fuel manifolds and reservoirs. Each elongate forged member fluidly communicates first and second fuels from first and second fuel sources 12 and 14 respectively to fuel injectors 31a, 31b, 31c and 32a, 32b, 32c respectively as will herein be described. Although there are two elongate forged members in the illustrated embodiment, in other embodiments the multi-fuel rail apparatus can comprise a single elongate forged member or, in general, a plurality of elongate forged members. In an exemplary embodiment the first fuel is a gaseous fuel and the second fuel is a liquid fuel. As used herein a gaseous fuel is any fuel that is in a gas state at standard temperature and pressure that in the context of this application is 20 degrees Celsius (° C.) and 1 atmosphere (ATM), and a liquid fuel is in the liquid state at the standard temperature and pressure. Elongate forged members 21 and 22 are similar and to simplify the discussion the features of these members will be described with reference to elongate forged member 21. Like features between the elongate forged members have like reference numerals with reference numerals related to member 21 ending with a '1' and those related with member 22 ending with '2'. Like features between the elongate forged members may only be illustrated for member 21 and it is understood that member 22 has these features. With reference to FIG. 2, elongate forged member 21 has first longitudinal bore 41 spaced apart from second longitudinal bore 51 for fluidly communicating the first and second fuels respectively. Longitudinal bore 41 is a first fuel rail (or first fuel passageway), and longitudinal bore 51 is a second fuel rail (or second fuel passageway) of rail apparatus 10. In the illustrated embodiment a first diameter of first longitudinal bore 41 is greater than a second diameter of second longitudinal bore 51, although this is not a requirement, and in other embodiments the diameters may be equal or the first diameter may be less than the second diameter. The diameter of the bores is dependent upon a variety of factors including the density of the fuel, the maximum required mass flow rate through the bores and the pressure and temperature of the fuel therein. First and second longitudinal bores 41 and 51 are blind bores in the illustrated embodiment, although this is not a requirement, where with reference to FIG. 1 the first longitudinal bore has fuel inlet 61 at end 341 of forged member 21 and fuel outlet 71 along surface 191 near end 351, and the second longitudinal bore has fuel inlet 81 at end 351 and fuel outlet 91 along surface 191 near end 341. By locating fuel inlets 61 and 81 at opposite ends of forged member 21 there is improved tool access for fastening source fuel conduits to these fuel inlets.

There are a variety of ways of interconnecting the fuel inlets and outlets of members 21 and 22 with each other and with the sources of the first and second fuels. In the illustrated embodiment conduit 100 fluidly connects fuel outlet 72 with fuel inlet 61, and conduit 110 fluidly connects fuel outlet 91 with fuel inlet 82. Conduits 100 and 110 are also referred to as cross-over connections. Fuel outlet 71 is closed with termination 120 and fuel outlet 92 is closed with termination 130. Terminations 120 and 130 can be plugs that are inserted into the fuel outlets. Alternatively, during the manufacturing of forged members 21 and 22 the fuel outlets can be made blocked off permanently by forging accordingly, which can later be opened up by drilling respective bores through the forged metal. The first and second fuels can be distributed through members 21 and 22 when fuel inlet 62 is fluidly connected with the source of the first fuel and fuel inlet 81 is fluidly connected with the source of the second fuel.

In other embodiments the fuel inlets and outlets of members 21 and 22 can be interconnected with each other and with the sources of the first and second fuels in alternative ways. For example, in other embodiments the sources of the first and second fuels can be fluidly connected with fuel inlets 61, 81 respectively of member 21, and fuel outlets 71, 91 can be fluidly connected with fuel inlets 62, 82 of member 22, whose fuel outlets 72, 92 are terminated accordingly. In further embodiments, the source of the first fuel can be fluidly connected with fuel inlets 61, 62, and the source of the second fuel can be fluidly connected with fuel inlets 81, 82 such that fuel outlets 71, 72, 91, 92 are terminated accordingly. Alternatively, the fuel inlets and outlets herein described can operate as fuel outlets and inlets respectively.

In an exemplary embodiment, conduits 100 and 110 can be disassembled from multi-fuel rail apparatus 10 without having to disassemble any other part of the multi-fuel rail apparatus. Mounting lug 331 is employed to secure forged member 21 to an engine, and preferably a cylinder head of the engine, by way of a mounting arm (not shown). Although only one mounting lug 331 is illustrated in the drawings, there is typically a plurality of mounting lugs. The angles between the longitudinal axes of respective fuel inlets and outlets is preferably substantially 90 degrees or greater such that conduits 100 and 110 can be assembled and disassembled without having to disassemble and assemble forged members 21 and 22. That is, when multi-fuel rail apparatus 10 is fully assembled, conduits 100 and 110 can be disassembled without having to disassemble forged members 21 and/or 22 from their respective mounting lugs. For example, the angle between longitudinal axis 103 of fuel inlet 61 and longitudinal axis 105 of fuel outlet 72 is at least substantially 90 degrees, and the angle between longitudinal axis 107 of fuel inlet 82 and longitudinal axis 109 of fuel outlet 91 is substantially 90 degrees or greater.

In the illustrated embodiment elongate forged member 21 includes three branch connecting structures 141*a*, 141*b* and 141*c* that are fluidly connected with respective branch connections 151*a*,161*a*; 151*b*, 161*b* and 151*c*, 161*c* for fluidly communicating the first and second fuels to fuel injectors 31*a* to 31*c* respectively. In other embodiments the elongate forged members can in general each comprise one or more branch connecting structures. Each branch connecting structure includes a fuel port from the first fuel rail and a fuel port from the second fuel rail. Branch connecting structure 141*b* is now described in more detail, and it is understood that the other branch connecting structures (141*a*, 141*c*, 142*a*, 142*b* and 142*c*) are similar with like features. Branch connecting structure 141*b* includes first boss 171*b* and second boss 181*b* extending from outer surface 191 of elongate forged member 21. First boss 171*b* forms a female connector for branch connection 151*b* and second boss 181*b* forms a male connector for branch connection 161*b*. As used herein, a boss is a protuberant part or body, With reference to FIG. 2, boss 171*b* includes first lateral bore 211 extending between first inwardly tapering section 201 and longitudinal bore 41. Annular collar 221 extends outwardly from inwardly tapering section 201 and is threaded on inner surface 231 such that it can mutually engage nut 241 of branch connection 151*b* to secure end form 251 of fuel line 261 to the inwardly tapering section to form a fluid tight seal between the branch connection and longitudinal bore 41. In exemplary embodiments, a surface shape of first inwardly tapering section 201 can be one of a frustoconical surface, a spherical surface, a parabolic surface and a hyperbolic surface. The angle between longitudinal axis 203 of boss 171*b* and longitudinal axis 205 of the fuel inlet for the first fuel on fuel injector 31*b* preferably is at least substantially 90 degrees such that fuel line 261 can be disassembled from boss 171*b* of branch connecting structure 141*b* without having to disassemble any other part of multi-fuel rail apparatus 10. It is possible that contact region 361 between end form 251 and nut 241 may form a fluid seal such that in the undesired event of fuel leaking past the seal between the end form and inwardly tapering section 201 (the primary seal), the fuel would be trapped in chamber 401 by the seal formed at the contact region. This trapped fuel can reduce the clamp load of nut 241 and may encourage (increase) the leak at the primary seal. Weep line 371 prevents fuel pressure build-up between the primary seal and contact region 361 by allowing the first fuel to escape. During assembly of multi-fuel rail apparatus 10, detection of the first fuel escaping from weep line 371 can be employed to determine whether fuel is leaking past the primary seal. When the first fuel is a gaseous fuel, a liquid can be applied at the exit of weep line 371 to watch for bubbles forming. When the first fuel is a liquid, dripping fluid at the exit can be used as an indication of a leaking primary seal. Nut 241 can extend through valve cover 400 such that the valve cover does not need to be removed in order to loosen the nut. A tube (not shown) can extend between the outlet of weep line 371 to outside of the valve cover, to communicate fuel from the weep line outside of the valve cover, to reduce accumulation of fuel from the weep line under the valve cover.

Figure 3:
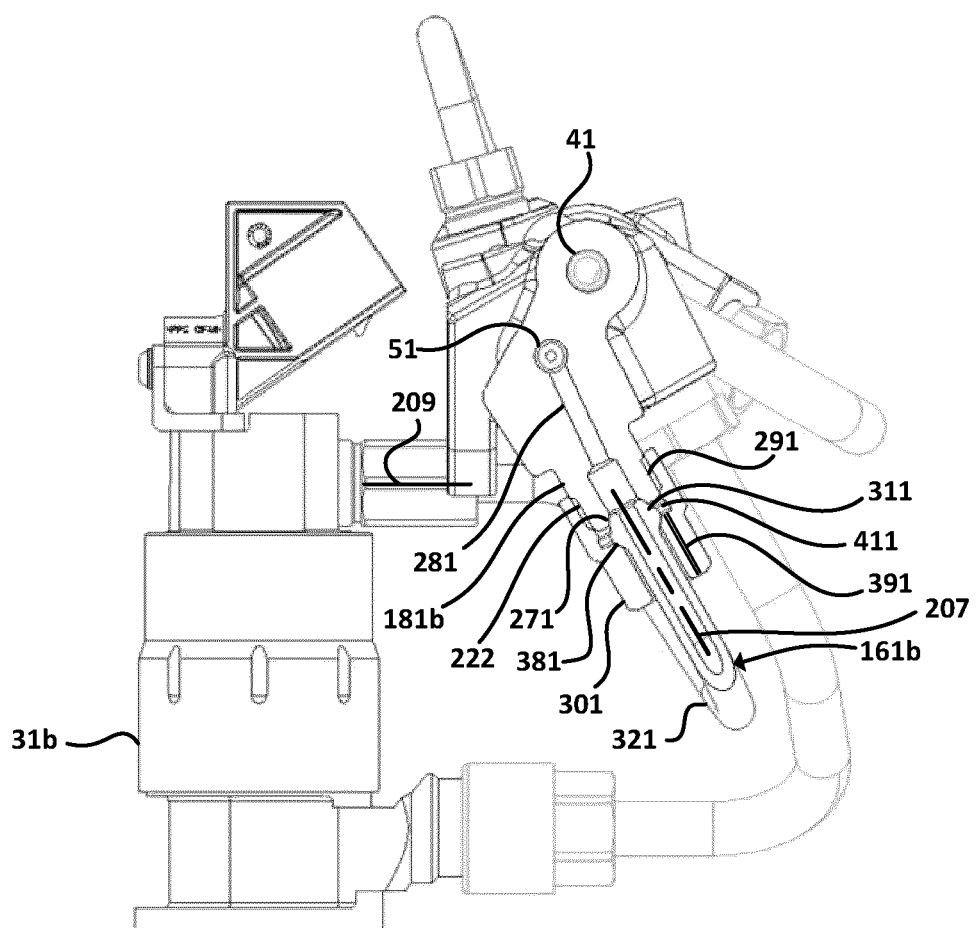
FIG. 3 is a cross-sectional view of a branch connecting structure in fluid communication with a second longitudinal bore of the multi-fuel rail apparatus and a branch connection of FIG. 1

With reference to FIG. 3, boss 181*b* includes second lateral bore 281 extending between second inwardly tapering section 271 and longitudinal bore 51. Annular collar 222 extends inwardly from inwardly tapering section 271 and is threaded on outer surface 291 such that it can mutually engage nut 301 of branch connection 161*b* to secure end form 311 of fuel line 321 to the inwardly tapering section to form a fluid tight seal between the branch connection and longitudinal bore 51. In exemplary embodiments, a surface shape of second inwardly tapering section 271 can be one of a frustoconical surface, a spherical surface, a parabolic surface and a hyperbolic surface. The angle between longitudinal axis 207 of boss 181*b* and longitudinal axis 209 of the fuel inlet for the second fuel on fuel injector 31*b* is at least substantially 90 degrees such that fuel line 321 can be disassembled from boss 181*b* of branch connecting structure 141*b* without having to disassemble any other part of multi-fuel rail apparatus 10. It is possible that contact region 381 between end form 311 and nut 301 may form a fluid seal such that in the undesired event of fuel leaking past the seal between the end form and inwardly tapering section 271 (the primary seal), the fuel would be trapped in chamber 411 by the seal formed at the contact region. This trapped fuel can reduce the clamp load of nut 301 and may encourage (increase) the leak at the primary seal. Axial weep line 391 prevents fuel pressure build-up between the primary seal and contact region 381 by allowing the second fuel to escape. During assembly of multi-fuel rail apparatus 10 detection of the second fuel escaping from weep line 391 can be employed to determine whether fuel is leaking past the primary seal. When the second fuel is a gaseous fuel, a liquid can be applied at the exit of weep line 391 to watch for bubbles forming. When the second fuel is a liquid, dripping fluid at the exit can be used as an indication of a leaking primary seal. In alternative embodiments, a weep line can be cross-drilled through boss 181*b* to allow fuel to escape chamber 411. Nut 301 can extend through the valve cover (not shown) such that the valve cover does not need to be removed in order to loosen the nut. A tube (not shown) can extend between the outlet of weep line 391 to outside of the valve cover (when the nut doesn't extend therethrough), to communicate fuel from the weep line outside of the valve cover, to reduce accumulation of fuel from the weep line under the valve cover.

The diameter of lateral bores 211 and 281 can be sized according to their respective longitudinal bores 41 and 51 and respective fuel pressures to reduce pressure pulsations caused by the injection of fuel through the fuel injectors. In this regard, the lateral bores operate as restricted orifices that reduce pressure fluctuations near injection valves in the fuel injectors from travelling to the longitudinal bores.

By making boss 171b a female connector and boss 181b a male connector, these bosses can be located closer to each other compared to if they were the same sex while still providing the clearance required by the tools for fastening the branch connections thereto. Additionally, when the first and second elongate members are forged or machined from stock metal, the bosses can be placed closer to each other compared to fabricated rails that employ slip on fittings. When the bosses are closer to each other there is an improvement in the packaging envelope of multi-fuel rail apparatus 10 such that there is more freedom to locate the apparatus under the valve cover. In an exemplary embodiment each branch connection has a male connection on one end and a female connection on the other end, which prevents the misconnection of the first and second fuel rails with their respective fuel inlets on the fuel injectors.

Unlike fabricated and assembled fuel rails that rely on wall thickness of cylindrical tubes and fittings (welded or fastened to the cylindrical tubes) for creating sealing structures, bosses 171b, 181b are integrated into forged members 21 and 22 during the forging process, and sufficient material can be added to the bosses such that fluid tight sealing structures can be created that can seal against pressures of gaseous fuel and liquid fuel that are suitable for high pressure direct injection. For example, in those embodiments when gaseous fuel pressure is maintained within a predetermined margin of liquid fuel pressure, such as in dual fuel injectors that employ the liquid fuel as both a fuel and a hydraulic fluid, gaseous fuel pressure in first longitudinal bore 41 (seen in FIG. 2) can be on the order of 750 bar (and even higher), and liquid fuel pressure in second longitudinal bore 51 can be at a comparable but slightly higher pressure. When gaseous fuel pressure is not maintained within a predetermined margin of liquid fuel pressure, the incompressibility of liquid fuels can be taken advantage of to increase liquid fuel pressure much higher than the pressure of the gaseous fuel, which is a compressible fluid that characteristically takes more energy to compress. Cylindrical tube fuel rails rely on wall thickness to create a structurally sound and fluid tight seal, especially for gaseous fuels which are more difficult to seal than liquid fuels and typically require higher sealing pressure, and as a result fabricated fuel rail assemblies are inherently heavier than a forged rail assembly employing forged member 21 since the material for the sealing structure in forged member 21 is concentrated at branch connecting structures 141[a-c] instead of all the way along the forged member. The combination of two longitudinal bores in the forged member (one for each fuel) and branch connecting structures with bosses for the branch connections results in a substantially reduced packaging envelope compared to a fabricated fuel rail assembly that includes two cylindrical fuel rails and associated fittings for branch connections. In some applications there is no space to integrate the fabricated fuel rail assembly under the valve cover without extensive redesign of the engine. The smaller packaging results in small fuel feed paths limiting undesirable pressure wave interactions. The split rail can allow more accurate gun drilling of the longitudinal bores. Forging allows the pair of bosses for each fuel injector to be placed in closer proximity to each other. One part can be forged allowing for a variety of secondary machining operations. Multi-fuel rail apparatus 10 reduces leak paths compared to fabricated rail assemblies since it reduces and preferably eliminates welds and reduces the number of seals required.

While particular elements, embodiments and applications of the present invention have been shown and described, it will be understood, that the invention is not limited thereto since modifications can be made by those skilled in the art without departing from the scope of the present disclosure, particularly in light of the foregoing teachings. For example, members 21 and 22 can be machined from metal stock instead of being forged. In some applications, bores 41 and 51 can be formed in metal stock, for example by drilling or gun drilling, and the branch connecting structures can be fittings that are slid into position there along and fastened.

What is claimed is:

1. A multi-fuel rail apparatus for an internal combustion engine communicating fuel from a first fuel source and a second fuel source to a plurality of fuel injectors, each fuel injector receiving fuel from the multi-fuel rail apparatus through a branch connection for each fuel, the multi fuel rail apparatus comprising:
   a first elongate member including a first longitudinal bore spaced apart from a second longitudinal bore and first and second fuel inlets for fluidly communicating first and second fuels into the first and second longitudinal bores respectively, the first longitudinal bore has a first longitudinal axis and the second longitudinal bore has a second longitudinal axis, the second longitudinal axis being spaced apart from the first longitudinal axis; and
   a branch connecting structure for each fuel injector along the first elongate member for fluidly connecting the first longitudinal bore with a first respective branch connection extending from a first respective fuel injector and connecting the second longitudinal bore with a second respective branch connection extending from the first respective fuel injector, each of the branch connecting structures includes:
      a first boss extending from an outer surface of the first elongate member for fluidly connecting with the first respective branch connection, the first boss is fluidly connected with the first longitudinal bore; and
      a second boss extending from the outer surface of the first elongate member for fluidly connecting with the second respective branch connection, the second boss is adjacent to the first boss and is fluidly connected with the second longitudinal bore.

2. The multi-fuel rail apparatus of claim 1, wherein the first elongate member is a first elongate forged member.

3. The multi-fuel rail apparatus of claim 1, wherein the first fuel is a gaseous fuel and the second fuel is a liquid fuel.

4. The multi-fuel rail apparatus of claim 1, wherein the first boss comprises a first inwardly tapering section and a first lateral bore extending between the first inwardly tapering section and the first longitudinal bore, the second boss comprises a second inwardly tapering section and a second lateral bore extending between the second inwardly tapering section and the second longitudinal bore, the first and second inwardly tapering sections for fluid sealing engagement with the first and second respective branch connections.

5. The multi-fuel rail apparatus of claim 4, wherein:
   the first boss comprises a first annular collar extending outwardly from the first inwardly tapering section, the first annular collar including threads on an inner surface thereof; and the second boss comprises a second annular collar extending inwardly from the second inwardly tapering section, the second annular collar including threads on an outer surface thereof.

6. The multi-fuel rail apparatus of claim 4, wherein a surface shape of the first and second inwardly tapering sections are one of a frustoconical surface, a spherical surface, a parabolic surface and a hyperbolic surface.

7. The multi-fuel rail apparatus of claim 4, wherein when the first boss is mutually engaged and secured with the first respective branch connection the first inwardly tapering section forms a gaseous fluid seal with the first respective branch connection.

8. The multi-fuel rail apparatus of claim 4, wherein at least one of the first and second bosses comprises a weep line downstream from the first and second inwardly tapering sections respectively.

9. The multi-fuel rail apparatus of claim 1, wherein the first and second longitudinal bores are blind bores, and the first longitudinal bore extends from one end of the first elongate member and the second longitudinal bore extends from an end opposite the one end of the first elongate member.

10. The multi-fuel rail apparatus of claim 1, further comprising a second elongate member having first and second longitudinal bores and first and second fuel inlets for fluidly communicating the first and second fuels into the first and second longitudinal bores respectively.

11. The multi-fuel rail apparatus of claim 10, wherein the first and second elongate members are first and second elongate forged members respectively.

12. The multi-fuel rail apparatus of claim 10, further comprising a first conduit fluidly connecting a first fuel outlet of the first elongate member with the first fuel inlet of the second elongate member; and a second conduit fluidly connecting a second fuel outlet of the first elongate member with the second fuel inlet of the second elongate member.

13. The multi-fuel rail apparatus of claim 12, wherein a first fuel outlet and a second fuel outlet of the second elongate member are each fluidly sealed shut with a termination.

14. The multi-fuel rail apparatus of claim 12, wherein an angle between longitudinal axes of the first fuel outlet of the first elongate member and the first fuel inlet of the second elongate member is at least 90 degrees and an angle between longitudinal axes of the second fuel outlet of the first elongate member and the second fuel inlet of the second elongate member is at least 90 degrees.

15. The multi-fuel rail apparatus of claim 10, further comprising a first conduit fluidly connecting a first fuel outlet of the first elongate member with the first fuel inlet of the second elongate member; and a second conduit fluidly connecting a second fuel outlet of the second elongate member with the second fuel inlet of the first elongate member.

16. The multi-fuel rail apparatus of claim 15, wherein an angle between longitudinal axes of the first fuel outlet of the first elongate member and the first fuel inlet of the second elongate member is at least 90 degrees and an angle between longitudinal axes of the second fuel outlet of the second elongate member and the second fuel inlet of the first elongate member is at least 90 degrees.

17. The multi-fuel rail apparatus of claim 15, wherein at least one of:
a first fuel outlet of the second elongate member and a second fuel outlet of the first elongate member are each sealed shut with a termination; and
the first fuel outlet of the first elongate member is at one end of at least the first elongate member, and the second fuel outlet of the first elongate member is at an end opposite the one end.

18. The multi-fuel rail apparatus of claim 1, wherein a first diameter of the first longitudinal bore is greater than a second diameter of the second longitudinal bore.

19. The multi-fuel rail apparatus of claim 1, wherein at least one respective branch connection comprises a nut including an axial weep line through the nut; or
at least one respective branch connection comprises a nut threadedly engaging the branch connecting structure, wherein the nut extends from the branch connecting structure through a valve cover of the internal combustion engine.

20. The multi-fuel rail apparatus of claim 1, wherein the first and second respective branch connections fluidly connect the first and second longitudinal bores with first and second fuel inlets respectively of a dual fuel injector.

21. The multi-fuel rail apparatus of claim 5, wherein the first boss extends alongside the second boss from the outer surface of the first elongate member, the second boss extends a first distance from the outer surface of the first elongate member, and the first boss extends a second distance from the outer surface of the elongate member that is less than the first distance.

* * * * *